United States Patent [19]

Sako et al.

[11] Patent Number: 5,034,669
[45] Date of Patent: Jul. 23, 1991

[54] REGENERATIVE CIRCUIT FOR MOTOR DRIVE SYSTEM HAVING LEAKAGE CURRENT COMPENSATION

[75] Inventors: Akira Sako; Yoji Tsutsumishita, both of Aichi, Japan

[73] Assignee: Mitsubishi Denki Kabushiki Kaisha, Tokyo, Japan

[21] Appl. No.: 539,494

[22] Filed: Jun. 18, 1990

[30] Foreign Application Priority Data

Oct. 4, 1989 [JP] Japan ................................ 1-257912

[51] Int. Cl.[5] .............................................. H02P 3/00
[52] U.S. Cl. ....................................... 318/376; 318/63
[58] Field of Search ......................... 312/363, 375–378, 312/759–763, 87, 88; 318/379–381, 362, 366, 367, 63, 86, 794, 817

[56] References Cited

U.S. PATENT DOCUMENTS

| 4,039,914 | 8/1977 | Steigerwald et al. | 318/375 |
| 4,434,393 | 2/1984 | Kobari et al. | 318/762 |
| 4,521,724 | 6/1985 | Sakamoto et al. | 318/762 |
| 4,545,464 | 10/1985 | Nomura | 318/762 |
| 4,620,272 | 10/1986 | Fulton et al. | 318/762 |
| 4,667,776 | 3/1987 | Nomora | 318/759 |
| 4,761,600 | 8/1988 | D'Atre et al. | 318/759 |
| 4,823,066 | 4/1989 | Yoshiki et al. | 318/759 |

FOREIGN PATENT DOCUMENTS

60-62823 4/1985 Japan .
62-25883 2/1987 Japan .

Primary Examiner—William M. Shoop, Jr.
Assistant Examiner—A. Jonathan Wysocki
Attorney, Agent, or Firm—Rothwell, Figg, Ernst & Kurz

[57] ABSTRACT

A regenerative control circuit for controlling the regenerative energy of an electric motor drive system includes a regenerative energy dissipating resistor connected in parallel to a main smoothing capacitor through a switching element, a comparator connected to the switching element and adapted to produce an output signal to drive the switching element, a regenerative reference voltage rectifying circuit connected to a 3-phase a.c. power source, a regenerative reference voltage smoothing capacitor connected to the output of the regenerative reference voltage rectifying circuit, and a regenerative circuit including a regeneration transistor for entering a voltage difference, which is created between the main smoothing capacitor and the regenerative reference voltage smoothing capacitor by regenerative energy in certain circumstance, to the comparator. The circuit operates to control the regenerative energy, while maintaining the voltage of the main smoothing capacitor constant.

6 Claims, 6 Drawing Sheets

REGENERATIVE CIRCUIT FOR MOTOR DRIVE SYSTEM HAVING LEAKAGE CURRENT COMPENSATION

BACKGROUND OF THE INVENTION

1. Field of the Invention

The present invention relates to a regenerative control circuit which controls regenerative energy of an electric motor drive system, and more particularly to a regenerative control circuit which operates to maintain a converter voltage constant even in the case of a large leakage current.

2. Description of the Prior Art

Generally, an electric motor drive system is provided with a control circuit which controls, upon stoppage of the motor, the regenerative energy produced by the armature of the motor during the period within which the motor is brought to a complete stop.

Figure 1:
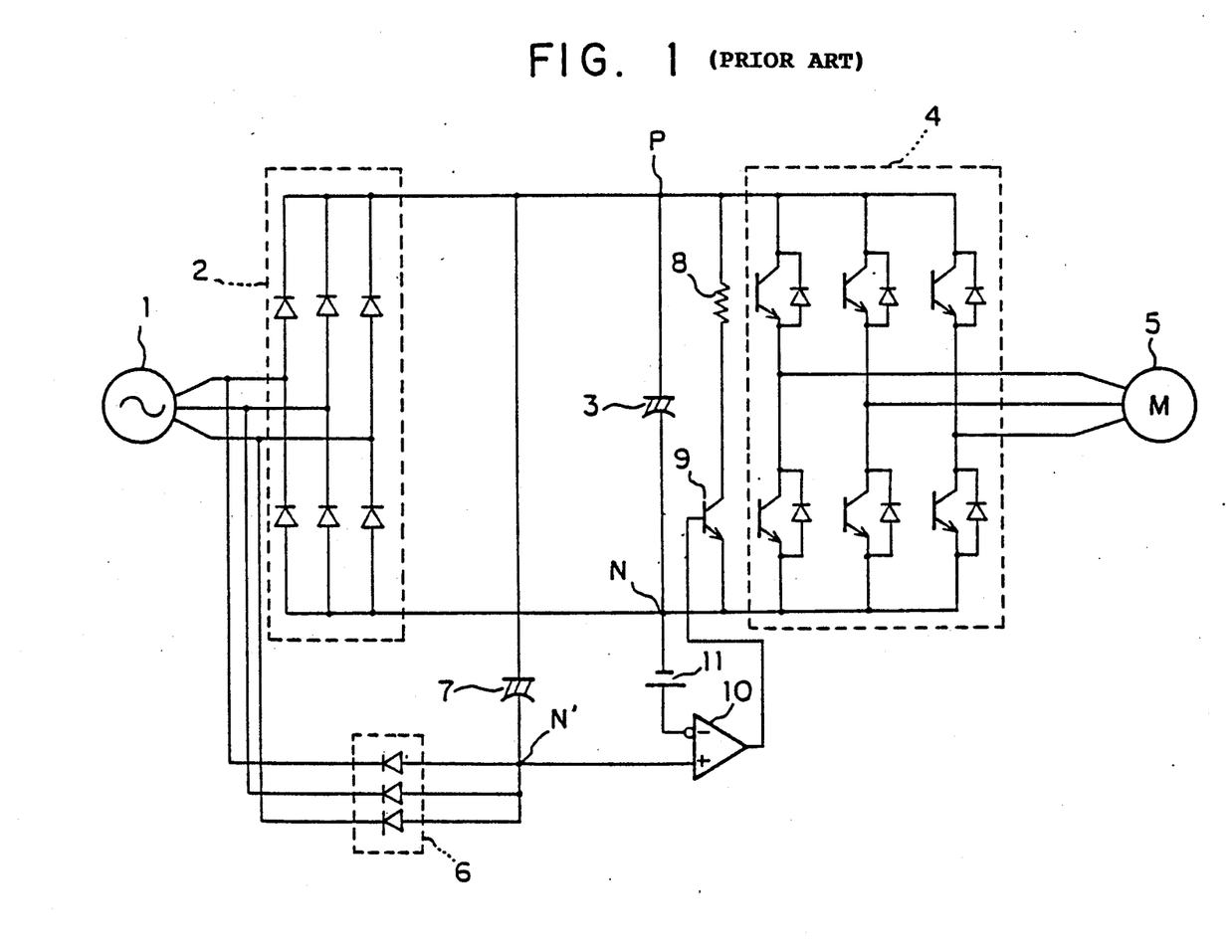
FIG. 1 shows a schematic diagram of the conventional regenerative control circuit for an electric motor drive system.
Figure 2:
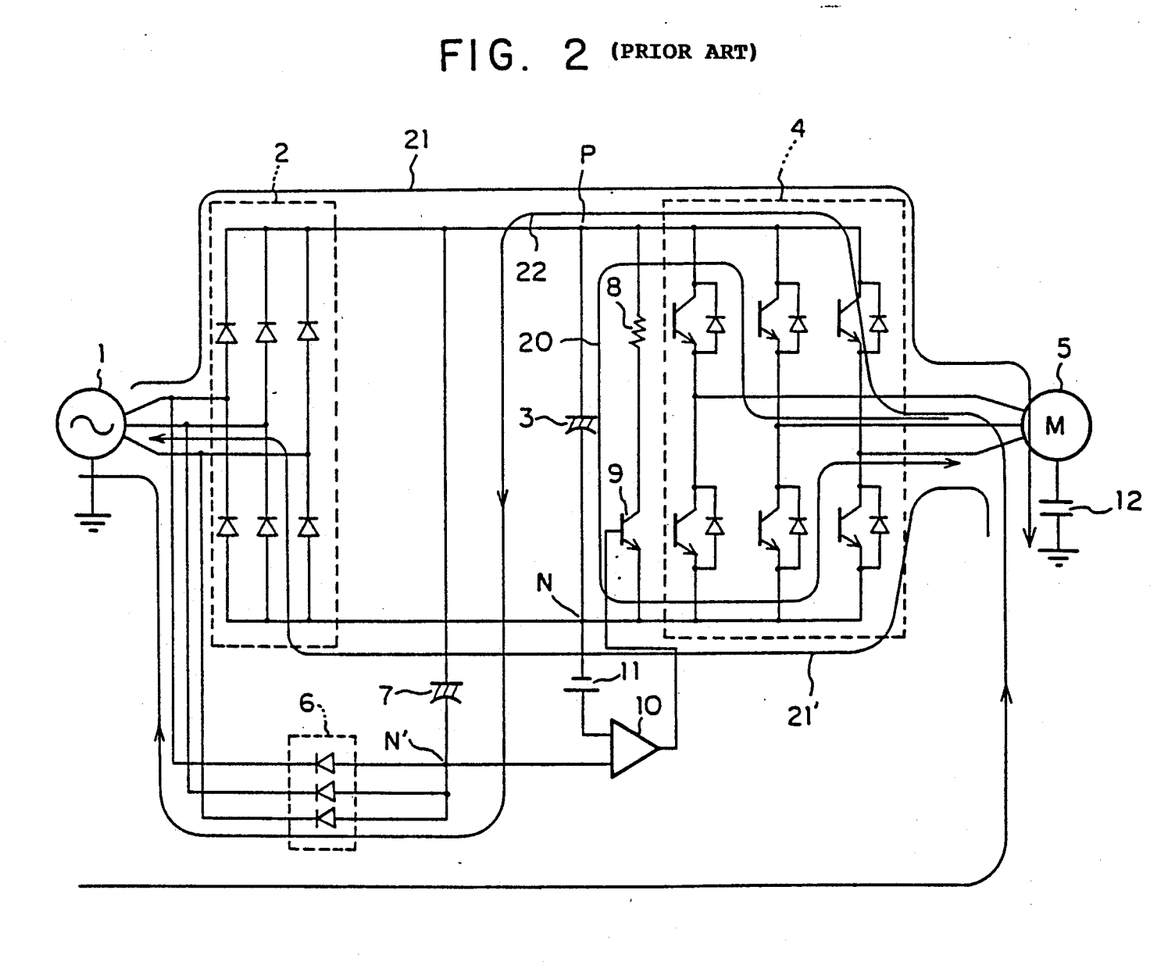
FIG. 2 shows a schematic diagram of the routes of leakage currents in the regenerative control circuit of FIG. 1.
Figure 3:
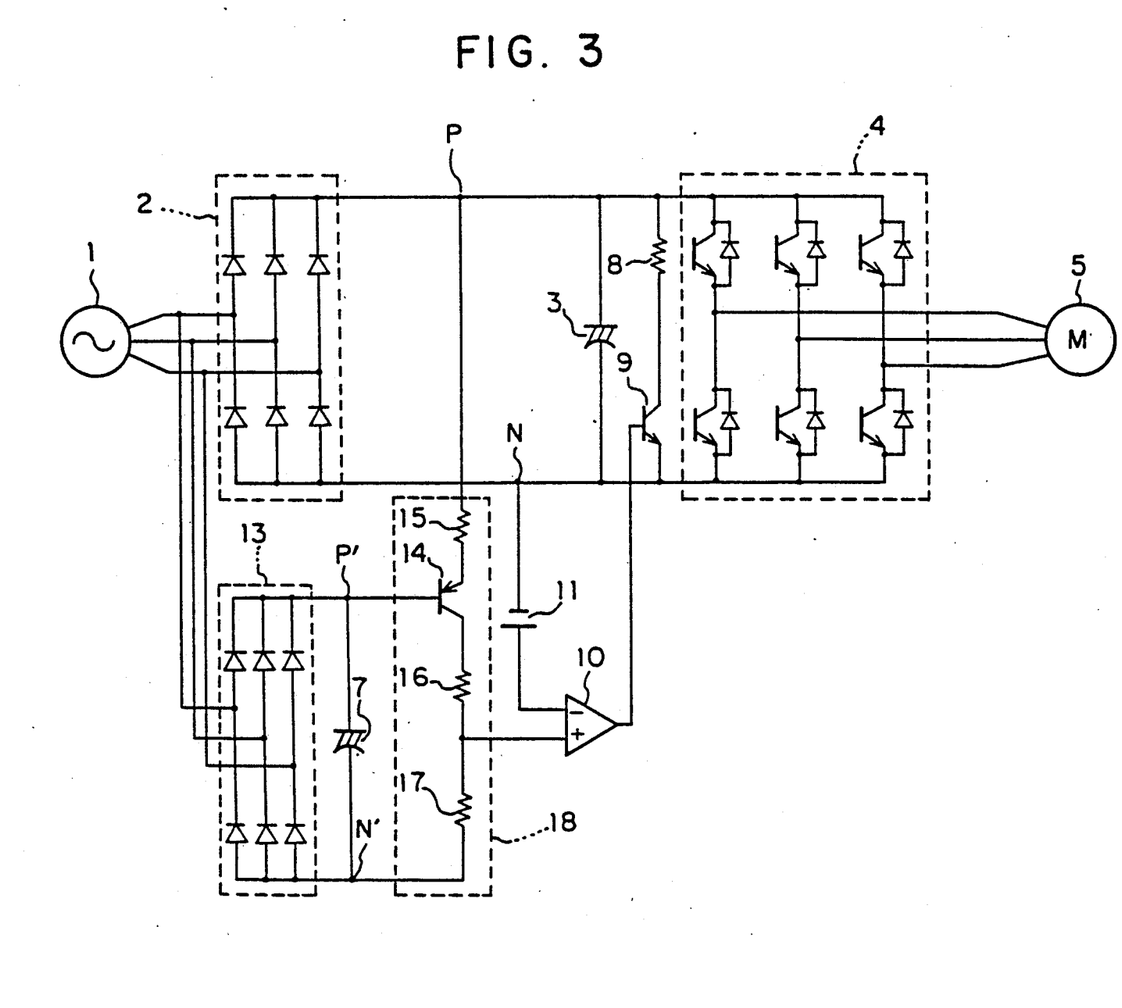
FIG. 3 shows a schematic diagram of a regenerative control circuit for an electric motor drive system according to an embodiment of the present invention.

FIG. 1 shows a schematic diagram of the conventional regenerative control circuit for an electric motor drive system, and FIG. 2 shows a schematic diagram in relation to the routes of leakage currents in the regenerative control circuit. In the figure, numeral 1 designates a 3-phase a.c. power source, 2 a main rectifying circuit consisting of six diodes connected to the 3-phase a.c. power source 1, 3 a main smoothing capacitor connected to the output of the main rectifying circuit 2, 4 an inverter having its input connected to the main smoothing capacitor 3, 5 an electric motor connected to the output of the inverter 4, 6 a regenerative reference voltage rectifying circuit consisting of three diodes connected to the 3-phase a.c. power source 1, 7 a regenerative reference voltage smoothing capacitor connected between the positive electrode of the main smoothing capacitor 3 and the regenerative reference voltage rectifying circuit 6, 8 a regenerative energy dissipating resistor, and 9 a switching transistor for regeneration having its collector connected in series with the regenerative energy dissipating resistor 8. The regenerative energy dissipating resistor 8 and the regeneration transistor 9 are connected in parallel to the main smoothing capacitor 3. Numeral 10 designates a comparator which has one input connected to the node N' between the regenerative reference voltage rectifying circuit 6 and the regenerative reference voltage smoothing capacitor 7 and another input connected to the negative electrode of the main smoothing capacitor 3 through a regeneration d.c. voltage source 11. The output terminal of the comparator 10 is connected to the base of the regeneration transistor 9.

Next, the operation of the above circuit arrangement will be described. When the motor 5 is operated to decelerate, a flow of regenerative energy of the motor 5 appears in the route 20 as shown in FIG. 2, and the regenerative energy returning to the inverter 4 raises the terminal voltage of the main smoothing capacitor 3. On the other hand, the regenerative energy does not flow into the regenerative reference voltage smoothing capacitor 7, since its negative terminal is not connected to the inverter 4, and therefore the terminal voltage of the smoothing capacitor 7 does not vary. The main smoothing capacitor 3 and the regenerative reference voltage, smoothing capacitor 7 have their positive terminals connected together, causing the rising voltage of the main smoothing capacitor 3 to appear between the negative terminal node N' of the regenerative reference voltage smoothing capacitor 7 and the negative terminal node N of the main smoothing capacitor 3. The comparator 10 monitors this voltage, and it turns on the regeneration transistor 9 when the voltage rise has exceeded the voltage of the regeneration d.c. voltage source 11 so that the regenerative energy is dissipated by the regenerative energy dissipating resistor 8, thereby maintaining the voltage of the main smoothing capacitor 3 constant in carrying out the regenerative control.

In the foregoing conventional regenerative control circuit for an electric motor drive system, the regenerative energy dissipating resistor 8 and regeneration transistor 9 in serial connection are connected in parallel to the main smoothing capacitor 3, the negative terminal of the main smoothing capacitor 3 is connected to one input of the comparator 10 through the regeneration d.c. voltage source 11, the negative terminal of the regenerative reference voltage smoothing capacitor 7 is connected to another input of the comparator 10, and the output of the comparator 10 is connected to the base of the regeneration transistor 9, and in operation the voltage between the main smoothing capacitor 3 and the regenerative reference voltage smoothing capacitor 7 is maintained constant with respect to the power voltage. When the motor 5 is operated to decelerate, its regenerative energy causes only the terminal voltage of the main smoothing capacitor 3 to rise and, since these capacitors 3 and 7 have their positive electrodes connected together, the voltage rise of the main smoothing capacitor 3 is a voltage difference N'-N between the capacitors 3 and 7. This differential voltage is delivered to the comparator 10, which produces an output to turn on the regeneration transistor 9 so that the regenerative energy is dissipated by the regenerative energy dissipating resistor 8, thereby maintaining the voltage of the main smoothing capacitor 3 constant. The inverter 4 operates in a high-frequency switching mode, and a stray capacitance 12 existing in the motor 5 and on the motor power lines creates leakage currents on the routes indicated by 21 and 21' in FIG. 2. When the motor 5 is in the regenerative operation at deceleration, a leakage current also flows on the route through ground as shown by 22 in FIG. 2, and if this leakage current is large, the voltage of the regenerative reference voltage smoothing capacitor 7 rises, and a rise in the terminal voltage of the main smoothing capacitor 3 caused by the regenerative energy will not produce a voltage difference between the capacitors 3 and 7. Consequently, the comparator 10 will not produce the output signal, and the regeneration transistor 9 will not turn on, leaving the voltage of the main smoothing capacitor 3 to rise, resulting in the failure to maintain a constant capacitor voltage.

SUMMARY OF THE INVENTION

The present invention is intended to overcome the foregoing prior art deficiency, and its prime object is to provide a regenerative control circuit for an electric motor drive system capable of maintaining the voltage of the main smoothing capacitor constant.

Another object of the present invention is to provide a regenerative control circuit for an electric motor drive system operative in overwhelmingly superior accuracy and performance of regenerative energy control as compared with the conventional control circuit, and yet realizable at a relatively low manufacturing cost.

A further object of the present invention is to provide a regenerative control circuit for an electric motor drive system realizable in a simple circuit structure of equal or smaller size than the conventional counterpart.

In order to achieve the above objectives, the regenerative control circuit for an electric motor drive system according to the present invention is designed to comprise a regenerative energy dissipating resistor connected in parallel to a main smoothing capacitor through a switching element, a comparator which produces an output signal to drive the switching element, a regenerative reference voltage rectifying circuit connected to a 3-phase a.c. power source, a regenerative reference voltage smoothing capacitor connected to the regenerative reference voltage rectifying circuit, and a regenerative circuit including a regeneration transistor which, if voltages on the positive terminals of the main smoothing capacitor and regenerative reference voltage smoothing capacitor are equal, does not conduct a leakage current to the regenerative reference voltage smoothing capacitor, but introduces a voltage difference of these capacitors created by the regenerative energy directly to the comparator, and, if voltages on the negative terminals of the main smoothing capacitor and regenerative reference voltage smoothing capacitor are equal, virtually does not conduct a leakage current to the regenerative reference voltage smoothing capacitor, but delivers a voltage difference of these capacitors created by the regenerative energy to the comparator after biasing the voltage difference.

In operation, when voltages on the positive terminals of the main smoothing capacitor and regenerative reference voltage smoothing capacitor are equal, the regeneration circuit turns off its regeneration transistor so that a leakage current does not flow to the regenerative reference voltage smoothing capacitor and it directly inputs a voltage difference of these capacitors created by the regenerative energy to the comparator, and when voltages on the negative terminals of the main smoothing capacitor and regenerative reference voltage smoothing capacitor are equal, the circuit turns on the regeneration transistor so that a leakage current virtually does not flow to the regenerative reference voltage smoothing capacitor and it inputs a voltage difference of these capacitors to the comparator after biasing the voltage difference, and in consequence when a voltage rise of the main smoothing capacitor emerges on either of its positive or negative terminal, a voltage difference of these capacitors is inputted to the comparator thereby to turn on the switching element so that the regenerative energy is dissipated by the regenerative energy dissipating resistor connected in parallel to the main smoothing capacitor, whereby the voltage of the main smoothing capacitor is maintained constant in carrying out the regenerative energy control.

In any case of a voltage rise of the main smoothing capacitor due to regenerative energy emerging on the positive or negative terminal of the capacitor, the regeneration transistor in the regeneration circuit operates to virtually prevent a leakage current from flowing to the regenerative reference voltage smoothing capacitor.

These and other objects and novel features of the present invention will become more apparent from the following detailed description taken in conjunction with the accompanying drawings. It should be noted, however, that the drawings are entirely for illustrative purposes and do not limit the scope of this invention.

DETAILED DESCRIPTION OF THE PREFERRED EMBODIMENT

A preferred embodiment of the present invention will be described in detail referring to the accompanying drawings.

FIG. 3 to FIG. 7 are diagrams according to the embodiment of this invention, in which component parts identical to those of the foregoing conventional arrangement are referred to by the same symbols and their explanation will not be repeated. Numeral 13 designates a regenerative reference voltage rectifying circuit made up of six diodes, and its output terminals are connected with a regenerative reference voltage smoothing capacitor 7, and 14 is a regeneration transistor having its base connected to the positive terminal P' of the regenerative reference voltage smoothing capacitor 7, its emitter connected through a resistor 15 to the positive terminal P of a main smoothing capacitor 3, and its collector connected through resistors 16 and 17 to the negative electrode terminal N' of the regenerative reference voltage smoothing capacitor 7. The node between the resistors 16 and 17 is connected to one input of a comparator 10. Numeral 18 designates a regeneration circuit formed of the regeneration transistor 14 and resistors 15, 16 and 17, and it operates to bias a voltage difference between terminals P and P' at the delivery to the input of the comparator 10.

Figure 7:
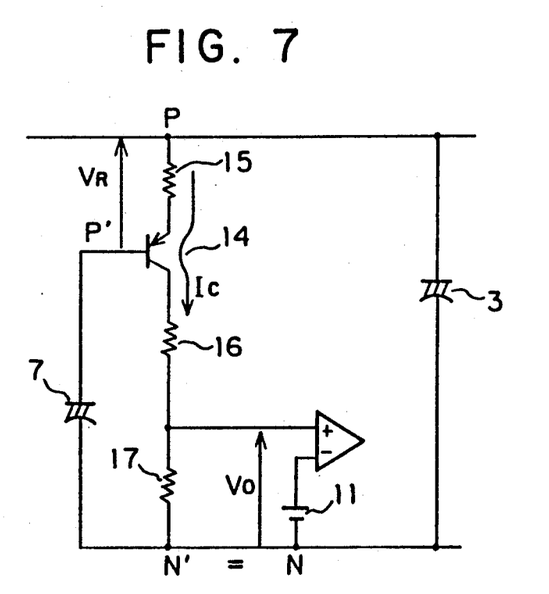
FIG. 7 shows an equivalent circuit of the inventive circuit arrangement when the voltage N is equal to the voltage N'.

Next, operation of the circuit will be described. In the regenerative control circuit for an electric motor drive system arranged as described above, when the motor 5 is operated to decelerate in a regeneration mode, voltages on the positive electrode P and negative electrode terminal N of the main smoothing capacitor 3 and on the positive terminal P' and negative terminal N' of the regenerative reference voltage smoothing capacitor 7 are as shown by the waveform of FIG. 5. Segments of equal P and P' and segments of unequal P and P' appear alternately, and segments of equal N and N' and segments of unequal N and N' appear alternately. The figure also shows that the difference between voltages P' and N' is constant, whereas the difference between voltages P and N is varying. As shown in the FIG. 4, when a leakage current in regenerative mode flows on the route 23, the N side of the main rectifying circuit 2 turns on, resulting in N=N'. In this case, the leakage current is large, and when it flows on the route 25 in FIG. 4, the regeneration transistor 14 develops a collector current $I_C$ as shown in FIG. 7. With the base current and base-emitter voltage being neglected, $I_C=V_R/R_2$. Since $N=N'$, the comparator 10 has its input voltage $V_0$ given as $V_0=I_C R_4=(R_4/R_2)V_R$. Choosing parameters so that $R_4=R_2$, then $V_R$ becomes equal to $V_0$, and a voltage rise of the main smoothing capacitor 3 appears between P and P', and accordingly the voltage difference between capacitors 3 and 7 is applied to the inputs of the comparator 10. In the conventional arrangement in this case, when a leakage current flows on the route 22 in FIG. 2, which is similar to the route 25 in FIG. 4 of this embodiment, when N is equal to N', a charging current flows into the regenerative reference voltage smoothing capacitor 7, whereas in this embodiment the leakage current on the route 25 flows through the emitter and collector of the regeneration transistor 14 and the base current, i.e., a current flowing to the regenerative reference voltage smoothing capacitor 7 is virtually none and therefore the capacitor 7 maintains a constant voltage even in the presence of a large leakage current. The voltage of the main smoothing capacitor 3 rises, causing the comparator 10 to turn on the regeneration transistor 9 so that the regenerative energy is dissipated by a regenerative energy dissipating resistor 8, whereby the voltage of the main smoothing capacitor 3 is maintained constant.

Figure 4:
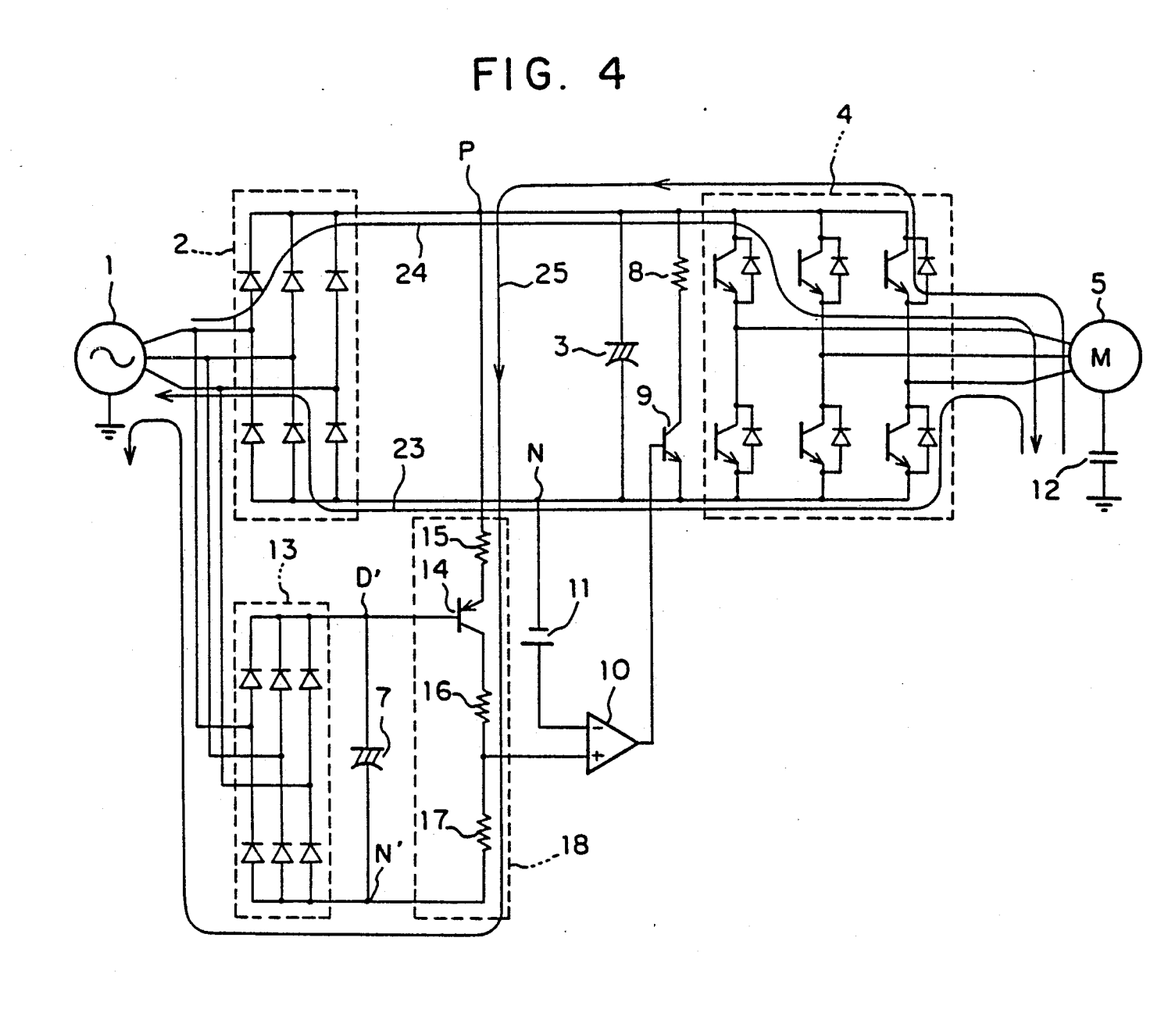
FIG. 4 shows a schematic diagram of the flow of leakage currents in the circuit arrangement of FIG. 3.
Figure 5:
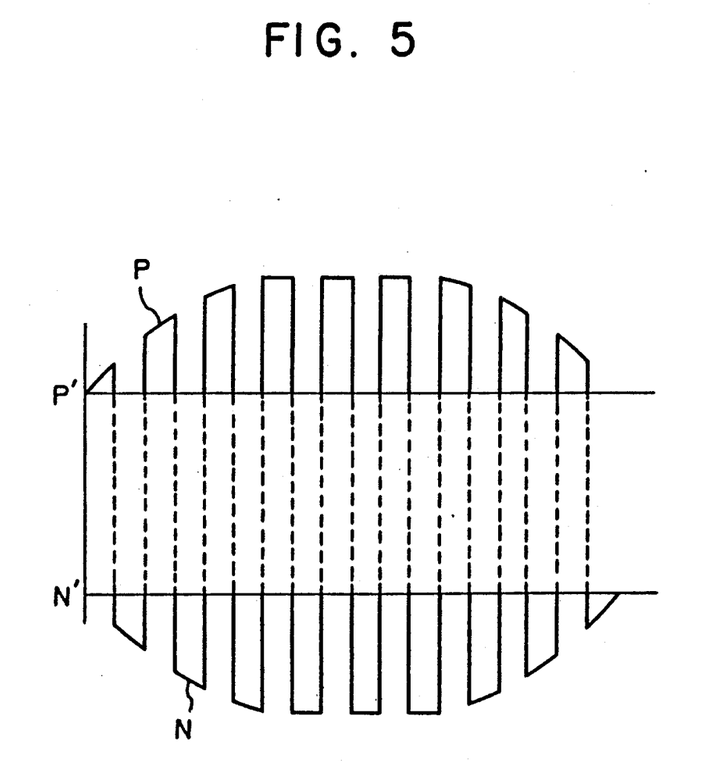
FIG. 5 shows a waveform diagram of the relation of voltages P, P', N and N' in the circuit of FIG. 3.
Figure 6:
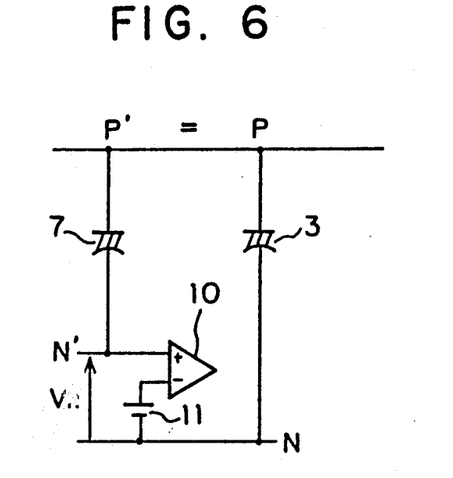
FIG. 6 shows an equivalent circuit of the inventive circuit arrangement when the voltage P is equal to the voltage P'.

Next, when a leakage current in the regenerative mode flows on the route 24 as shown in FIG. 4, a P side diode of the main rectifying circuit 2 becomes conductive, resulting in P=P'. In this case, the regeneration transistor 14 is cut off, and even a large leakage current cannot flow on the route 25 in FIG. 4. On this account, a voltage rise $V_R$ of the main smoothing capacitor 3 appears between N and N' as shown in FIG. 6, resulting in the delivery between a voltage difference of capacitors 3 and 7 to the inputs of the comparator 10. Consequently, the comparator 10 turns on the regeneration transistor 9 so that the regenerative energy is dissipated by the regenerative energy dissipating resistor 8, whereby the voltage of the main smoothing capacitor 3 is maintained constant.

With a leakage current flowing on either route 23 or 24 in regenerative mode, even if the leakage current is large and flows into the regeneration transistor 14, the voltage of the main smoothing capacitor 3 rises, delivering a voltage difference between the capacitors 3 and 7 to the comparator 10, which then turns on the regeneration transistor 9 so that the regenerative energy is dissipated by the regenerative energy dissipating resistor 8 whereby the voltage of the main smoothing capacitor 3 is maintained constant.

Although in the foregoing embodiment a pnp transistor is used for the regeneration transistor 14, it is of course possible to use an npn transistor for the regeneration transistor 14. In this case, the comparator 10 monitors the voltage difference between p and P'.

According to the present invention, as described above, when voltages on the positive terminals of the main smoothing capacitor and regenerative reference voltage smoothing capacitor are equal, the regeneration circuit including a regeneration transistor prevents a leakage current from flowing to the regenerative reference voltage smoothing capacitor and it directly inputs a voltage difference of these capacitors created by the regenerative energy to the comparator, and when voltages on the negative terminals of the main smoothing capacitor and regenerative reference voltage smoothing capacitor are equal, the circuit virtually prevents a leakage current from flowing to the regenerative reference voltage smoothing capacitor and it inputs a voltage difference of these capacitors to the comparator after biasing, and in consequence when a voltage rise of the main smoothing capacitor emerges on any of its positive or negative terminal, the voltage difference of these capacitors is inputs to the comparator thereby to turn on the switching element so that the regenerative energy is dissipated by the regenerative energy dissipating resistor connected in parallel to the main smoothing capacitor, whereby the voltage of the main smoothing capacitor is maintained constant without being affected by a leakage current in carrying out the regenerative energy control.

What is claimed is:

1. A regenerative control circuit for an electric motor drive system which includes a rectifying circuit connected to a 3-phase a.c. power source, a main smoothing capacitor connected to the output of said rectifying circuit, and an inverter having an input thereof connected to said main smoothing capacitor and an output thereof connected to an electric motor, said regenerative control circuit comprising:

regenerative energy dissipating means connected in parallel to said main smoothing capacitor through a switching element;
a comparator connected to said switching element and adapted to produce an output signal to drive said switching element;
a regenerative reference voltage rectifying circuit connected to said 3-phase a.c. power source and adapted to produce a regenerative reference voltage;
a regenerative reference voltage smoothing capacitor connected to the output of said regenerative reference voltage rectifying circuit; and
a regenerative circuit including a regeneration transistor for inputting a voltage difference which is created between said main smoothing capacitor and said regenerative reference voltage smoothing capacitor by regenerative leakage current energy, to said comparator after biasing said voltage difference.

2. A regenerative control circuit according to claim 1, wherein said regenerative energy dissipating means comprises a resistor.

3. A regenerative control circuit according to claim 1, wherein said regenerative reference voltage rectifying circuit is formed of six diodes.

4. A regenerative control circuit according to claim 1, wherein said switching element comprises a transistor.

5. A regenerative control circuit for an electric motor drive system, comprising:

regenerative energy dissipating means for dissipating excess regenerative energy connected in parallel to a main smoothing capacitor of said electric motor drive system through a switching element;
comparator means for developing a switching element drive signal for driving said switching element;
means for developing a regenerative reference voltage;
a regenerative circuit for biasing a voltage difference between said main smoothing capacitor and said regenerative reference voltage means and applying said voltage difference to said comparator means to develop said switching element drive signal.

6. A regenerative control circuit for a motor drive system according to claim 5, wherein said regenerative circuit comprises:
a transistor having an emitter connected to said main smoothing capacitor, a collector connected to said comparator means, and a base connected to said regenerative reference voltage means.

* * * * *

UNITED STATES PATENT AND TRADEMARK OFFICE
CERTIFICATE OF CORRECTION

PATENT NO. : 5,034,669

DATED : July 23, 1991

INVENTOR(S) : Akira Sako et al.

It is certified that error appears in the above-identified patent and that said Letters Patent is hereby corrected as shown below:

Column 1, line 35, delete "electrode" and insert therefor --terminal--.

Column 4, line 35, delete "with" and insert therefor --to--;
         line 42, delete "electrode";
         line 54, delete "electrode" (first occurrence) and insert therefor --terminal--; and delete "electrode" (second occurrence);
         line 64, delete "the";
         line 65, after "in" insert --the--.

Column 5, line 36, delete "between" and insert therefor --of--;
         line 36, after "difference" delete "of" and insert therefor --between--.

Column 6, line 8, delete "inputs" and insert therefor --inputted--.

Signed and Sealed this

Sixteenth Day of March, 1993

*Attest:*

STEPHEN G. KUNIN

*Attesting Officer*      *Acting Commissioner of Patents and Trademarks*